United States Patent
Fader et al.

(10) Patent No.: US 6,355,214 B1
(45) Date of Patent: *Mar. 12, 2002

(54) METHODS OF PREVENTING SCALING INVOLVING INORGANIC COMPOSITIONS, AND INORGANIC COMPOSITIONS THEREFOR

(75) Inventors: Mitzi K. Fader; Duy T. Nguyen, both of Jacksonville, FL (US); Xiang Huai Wang, Alpharetta, GA (US); Fushan Zhang, Jacksonville, FL (US); Tien-Feng Ling, Alpharetta, GA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/333,891

(22) Filed: Jun. 16, 1999

(51) Int. Cl.$^7$ ............................ C23F 11/06; C23F 11/18

(52) U.S. Cl. ............................................. 422/13; 422/18

(58) Field of Search ...................................... 422/13, 18

(56) References Cited

U.S. PATENT DOCUMENTS

| | | |
|---|---|---|
| 2,358,222 A | 9/1944 | Fink et al. |
| 2,539,305 A | 1/1951 | Hatch |
| 2,917,528 A | 12/1959 | Ramsey et al. |
| 2,964,549 A | 12/1960 | Ramsey et al. |
| 3,514,476 A | 5/1970 | Morita |
| 3,518,204 A | 6/1970 | Hansen et al. |
| 3,584,687 A | 6/1971 | Stanford et al. |
| 3,928,196 A | 12/1975 | Persinski et al. |
| 3,960,576 A | 6/1976 | Carter et al. |
| 3,965,027 A | 6/1976 | Boffardi et al. |
| 4,008,164 A | 2/1977 | Watson et al. |
| 4,080,375 A | 3/1978 | Quinlan |
| 4,206,033 A | 6/1980 | Neavel et al. |
| 4,444,675 A | 4/1984 | Goeldner |
| 4,457,847 A | 7/1984 | Lorenc et al. |
| 4,640,793 A | 2/1987 | Persinski et al. |
| 4,643,801 A | 2/1987 | Johnson |
| 4,650,591 A | 3/1987 | Boothe et al. |
| 4,671,888 A | 6/1987 | Yorke |
| 4,753,710 A | 6/1988 | Langley et al. |
| 4,778,006 A | 10/1988 | Derowitsch |
| 4,872,995 A | 10/1989 | Chen et al. |
| 4,931,189 A | 6/1990 | Dhawan et al. |
| 4,936,987 A | 6/1990 | Persinski et al. |
| 5,062,962 A | 11/1991 | Brown et al. |
| 5,124,046 A | 6/1992 | Sherwood et al. |
| 5,147,555 A | 9/1992 | Brown et al. |
| 5,182,028 A | 1/1993 | Boffardi et al. |
| 5,194,120 A | 3/1993 | Peats et al. |
| 5,259,974 A | 11/1993 | Chen et al. |
| 5,282,976 A | 2/1994 | Yeung |
| 5,292,834 A | 3/1994 | Watanabe et al. |
| 5,326,478 A | 7/1994 | Perez et al. |
| 5,378,372 A | 1/1995 | Carey et al. |
| 5,378,390 A | 1/1995 | Perez et al. |
| 5,407,583 A | 4/1995 | Gill et al. |
| 5,409,571 A | 4/1995 | Togo et al. |
| 5,441,602 A | 8/1995 | Harris et al. |
| 5,489,666 A | 2/1996 | Carey et al. |
| 5,496,914 A | 3/1996 | Wood et al. |
| 5,518,629 A | 5/1996 | Perez et al. |
| 5,518,630 A | 5/1996 | Freese et al. |
| 5,580,462 A | 12/1996 | Gill |
| 5,629,385 A | 5/1997 | Kuo |
| 5,647,995 A | 7/1997 | Kneller et al. |
| 5,672,279 A | 9/1997 | Sargent et al. |
| 5,772,893 A | 6/1998 | Reed et al. |
| 5,866,032 A | 2/1999 | Carey et al. |

FOREIGN PATENT DOCUMENTS

| | | |
|---|---|---|
| CA | 2229973 | 8/1998 |
| EP | 516382 | 12/1992 |
| EP | 916622 | 5/1999 |
| JP | 2-53551 | 11/1990 |
| WO | 97/17289 | 5/1997 |

OTHER PUBLICATIONS

Schellhamer et al., "Agents for the Control of Pitch, Scale and Other Nonmicrobiological Deposits", Chapter 2, pp. 1–8 and Fig. 1. No Date Available.

Announcement: "Announcing—A Major Breakthrough in Kraft Pitch Control", pp. 1–8. No Date Available.

(List continued on next page.)

*Primary Examiner*—Krisanne Thornton
(74) *Attorney, Agent, or Firm*—Greenblum & Bernstein, P.L.C.

(57) ABSTRACT

Method for inhibiting scale deposits in an aqueous system. The method may include adding anti-scalant to the aqueous system such that an amount of anti-scalant in the aqueous system is up to about 500 ppm, wherein the anti-scalant comprises at least one of polyvalent metal silicate and polyvalent metal carbonate, and wherein the aqueous system has a pH of at least about 9. The method may include adding anti-scalant to the aqueous system such that an amount of anti-scalant in the aqueous system is up to about 500 ppm, wherein the anti-scalant comprises at least one of polyvalent metal silicate and polyvalent metal carbonate, in the presence of up to about 0.4 ppm of cationic polymer. The method may include adding anti-scalant to the aqueous system at at least one of before a pulping digester and at a pulping digester, such that an amount of anti-scalant in the aqueous system is up to about 500 ppm, wherein the anti-scalant comprises at least one of polyvalent metal silicate and polyvalent metal carbonate. The method may involve adding a nucleation promoter/initiator to the aqueous system to inhibit formation of scale deposits, such that an amount of the nucleation promoter/initiator in the aqueous system is up to about 500 ppm. The method may involve adding first cations to the aqueous system and removing second cations which are distinct from the first cations from the aqueous system, to inhibit the second cations from forming scale deposits, wherein the aqueous system is at a temperature of about 70° C. to 500° C. Inorganic compositions therefor.

105 Claims, No Drawings

OTHER PUBLICATIONS

Gess, *Retention of Fines and Fillers During Papermaking*, p. 273 (1998).

*Tappi Journal*, vol. 77, p. 140 (Dec. 1994).

Adams, "Low–Cost Evaporator Upgrades Boost Performance, Reduce Sealing", *Pulp & Paper*, pp. 83–89 (Feb. 1999).

"Deactivation of Calcium Scaling Liquors", The Menbers of the Institute of Paper Chemistry, Project 3234, Report Three, pp. 88–119 (Nov. 1977).

Manahan, *Environmental Chemistry*, pp. 183–213 (1991).

*Kirk–Othmer Encyclopedia of Chemical Technology*, 3rd ed., vol. 24, pp. 367–384 (1984).

Boardman, "The Use of Organophilic Mineral Particulates in the Control of Anionic Trash Like Pitch", *TAPPI Proceedings*, pp. 533–538 (1996).

English language abstract of JP 2–53551.

METHODS OF PREVENTING SCALING INVOLVING INORGANIC COMPOSITIONS, AND INORGANIC COMPOSITIONS THEREFOR

BACKGROUND OF THE INVENTION

1. Field of the Invention

The present invention relates to methods and inorganic compositions, such as polyvalent metal silicates and polyvalent metal carbonates, for inhibiting the formation, deposition, and/or adherence of scale deposits on substrate surfaces in contact with a scale-forming aqueous system. The scale deposits may be alkaline earth metal scale deposits, such as alkaline earth metal carbonate scale deposits, especially calcium carbonate scale deposits. The present invention may be advantageously used to prevent scale in kraft pulping processes.

2. Discussion of Background

Scale build-up is a serious problem in many industrial water systems, such as cooling towers, heat exchangers, evaporators, pulping digesters, washers, and in the production and processing of crude oil-water mixtures, etc. The build-up of scale deposits reduces the efficiency of heat transfer systems, interferes with fluid flow, facilitates corrosive processes and harbors bacteria. Calcium carbonate, generated in various processes, is one of the most commonly observed scale formers in industrial water systems. This scale is an expensive problem in many industries, which causes delays and shutdowns for cleaning and removal.

In particular, most industrial waters contain metal ions, such as calcium, barium, magnesium, aluminium, strontium, iron, etc. and several anions such as bicarbonate, carbonate, sulfate, oxalate, phosphate, silicate, fluoride, etc. When combinations of these anions and cations are present in concentrations which exceed the solubility of their reaction products, precipitates form until product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, temperature or pressure, and the introduction of additional ions which form insoluble compounds with the ions already present in the solution. As these reaction products precipitate on the surfaces of the water carrying system, they form scale or deposits.

For boiler systems and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface. In addition to this, a common source of scale in boiler systems is the breakdown of calcium bicarbonate to form calcium carbonate water and carbon dioxide under the influence of heat.

For open recirculating cooling water systems, in which a cooling tower, spray pond, evaporative condenser, and the like serve to dissipate heat by evaporation of water, the chief factor which promotes scale formation is concentration of solids dissolved in the water by repeated evaporation of portions of the water phase. Thus, even a water which is not scale forming on a once-through basis usually will become scale forming when concentrated a multiple number of times.

Also as disclosed in U.S. Pat. No. 3,518,204 to HANSEN et al., the disclosure of which is herein incorporated by reference in its entirety, water supplies employed as cooling media frequently contain silts such as bentonitic or kaolinitic minerals. During use of such silt containing waters in these systems, the silts react or associate with other impurities which are present in the water such as calcium and magnesium which are commonly referred to as "hardness". As a consequence of such reaction or association, a precipitate is formed and precipitated upon the surfaces of the system containing the water. Such depositions may build up to the extent that flow through the system is reduced or halted, and the system must be shut down for costly cleaning. In addition, when such deposition occurs on heat transfer surfaces, heat exchange is reduced with a corresponding loss in process efficiency.

Scaling in kraft pulping processes occurs by a different mechanism as a result of the presence of organic ligands. Black liquor generated in the kraft pulping digester contains a very high content of organics such as lignin, fatty/rosin soaps, hemicelluloses, etc. Lignin fragments formed during pulping, specifically those containing adjacent hydroxyl groups on an aromatic ring, have a high tendency to interact with calcium (originally from tree) to greatly increase its solubility in black liquor. As the temperature increases (e.g., the temperature found near the tube wall of an evaporator or cooking heater), the pH has a tendency to decrease, especially if the residual active alkali is low. As a consequence, calcium ions can be displaced from the lignin by hydrogen ions, and react with carbonate ions thus producing calcium carbonate scale. In addition to lignin, there are many different organic species that complex calcium in the black liquor. Any of these organic species, whose ability to complex with calcium depends on the pH being in the normal pH range of black liquor, will contribute to calcium carbonate scaling by releasing ionic calcium as the temperature increases. Therefore, as long as some of the aforementioned organic compounds are present and sufficient calcium is available, a liquor will have the capacity to deposit calcium carbonate scale. In addition to calcium and carbonate, black liquor normally contains a number of other ions such as sodium and sulfate which can precipitate and form scale.

In the paper industry, alkalinity from alkali digesting solution and from dissolved solids from the wood chips, results in an increased alkalinity of the black liquor, often reaching pH's of 12–13 and even higher. Under high pH conditions, the precipitation of calcium carbonate is especially difficult to control. Acid is often added to lower the pH to prevent calcium carbonate scaling.

In the oil industry, the formation of insoluble calcium salts is also a problem in the secondary recovery of oil from subterranean formations by processes in which water is introduced into injection wells and forced through the underground formations to cause oil to be produced in a producing well. This type of process is usually referred to as a waterflood system.

In view of the above, scale formation and deposition are generated by the mechanisms of nucleation, crystal growth, and aggregation of scale-forming particles. Various approaches to reducing scale development include inhibition of nuclei/crystal formation, modification of crystal growth, and dispersion of the scale-forming particles.

Chelating or sequestering agents have been commonly used to prevent deposition, precipitation and crystallization of calcium carbonate in water-carrying systems. Other types of chemicals which have been actively explored as calcium carbonate scale inhibiting agents are threshold inhibitors.

Threshold inhibitors include water soluble polymers, phosphonates, and polyphosphates (e.g., U.S. Pat. No. 5,182,028 to BOFFARDI et al., the disclosure of which is herein incorporated by reference in its entirety, discloses sodium hexametaphosphate and monofluorophosphate). Such chemicals are effective as scale inhibitors in amounts considerably less than that stoichiometrically required.

Water soluble polymers, including groups derived from acrylamide, maleic acid, vinyl acetate, vinyl alcohol, and acrylic acid have been used to control calcium carbonate deposition. For instance, such polymers are disclosed in U.S. Pat. No. 5,282,976 to YEUNG; U.S. Pat. No. 5,496,914 to WOOD et al.; U.S. Pat. No. 4,008,164 to WATSON et al.; U.S. Pat. No. 3,518,204 to HANSEN et al.; U.S. Pat. Nos. 3,928,196 and 4,936,987 to PERSINSKI et al.; U.S. Pat. No. 3,965,027 to BOFFARDI et al.; U.S. Pat. No. 5,441,602 to HARRIS et al.; U.S. Pat. No. 5,580,462 to GILL; and U.S. Pat. No. 5,409,571 to TOGO et al., the disclosures of which are herein incorporated by reference in their entireties.

Polyallylamines having phosphonic, carboxylic, or sulfonic groups are also used as scale control agents as disclosed in U.S. Pat. No. 5,629,385 to KUO and U.S. Pat. No. 5,124,046 to SHERWOOD et al., the disclosures of which are herein incorporated by reference in their entireties.

Additionally, a number of anionic polyelectrolytes, such as polyacrylates, polymaleic anhydrides, copolymers of acrylates and sulfonates, and polymers of sulfonate styrenes, have been employed. Examples of polyelectrolytes are disclosed in U.S. Pat. No. 4,640,793 to PERSINSKI et al.; U.S. Pat. No. 4,650,591 to BOOTHE et al.; U.S. Pat. No. 4,457,847 to LORENC et al.; U.S. Pat. No. 5,407,583 to GILL et al.; and U.S. Pat. No. 4,671,888 to YORKE, the disclosures of which are herein incorporated by reference in their entireties.

Polyepoxysuccinic acid for inhibiting the formation and deposition of scale in aqueous systems is disclosed in U.S. Pat. Nos. 5,062,962 and 5,147,555 to BROWN et al., the disclosures of which are herein incorporated by reference in their entireties.

Phosphonate based compounds are extensively used as calcium carbonate scale control agents. Examples include ether diphosphonate (U.S. Pat. No. 5,772,893 to REED et al., and U.S. Pat. No. 5,647,995 to KNELLER et al., the disclosures of which are herein incorporated by reference in their entireties), hydroxyethylidene-1,1-diphosphonic acid, amino tri(methylene phosphonic acid), aminomethylene phosphonates (U.S. Pat. No. 4,931,189 to DHAWAN et al., the disclosure of which is herein incorporated by reference in its entirety), N,N-bis(phosphonomethyl)-2-amino-1-propanol (U.S. Pat. No. 5,259,974 to CHEN et al., the disclosure of which is herein incorporated by reference in its entirety), methylene phosphonates of amino-terminated oxyalkylates (U.S. Pat. No. 4,080,375 to QUINLAN, the disclosure of which is herein incorporated by reference in its entirety), polyether polyamino methylene phosphonates (EP 0 516 382 B 1, the disclosure of which is herein incorporated by reference in its entirety), and ethanolamine N,N-dimethylene phosphonic acid (U.S. Pat. Nos. 2,917,528 and 2,964,549 to RAMSEY et al., the disclosures of which are herein incorporated by reference in their entireties).

Additionally, it is known that certain inorganic polyphosphonates would prevent precipitation when added in amounts less than the concentrations needed for sequestering or chelating, as disclosed in U.S. Pat. No. 2,358,222 to FINK et al. and U.S. Pat. No. 2,539,305 to HATCH, the disclosures of which are herein incorporated by reference in their entireties.

U.S. Pat. No. 3,960,576 to CARTER et al., the disclosure of which is herein incorporated by reference in its entirety, discloses that inorganic-silicate-based compositions also comprised of an organic phosphonate and carboxy methyl cellulose are useful for inhibiting corrosion of metal surfaces.

MANAHAN, *Environmental Chemistry*, pp. 183–213 (1991), the disclosure of which is herein incorporated by reference in its entirety, with particular attention directed to pp. 193–195, discloses use in environmental chemistry of sodium aluminum silicate minerals or zeolites as water softeners. The softening of water by aluminum silicate minerals and zeolites is based on ion-exchanging properties of the minerals. The divalent cations, which are responsible for water hardness, are replaced by sodium ions contained in the aluminum silicates, and then removed by filtration. An example of a micaceous mineral which has been used commercially in water softening is glauconite, $K_2(MgFe)_2Al_6(Si_4O_{10})_3OH_{12}$.

*Kirk-Othmer Encyclopedia of Chemical Technology*, 3rd ed., vol. 24, pp. 367–384 (1984), the disclosure of which is herein incorporated by reference in its entirety, discloses that deposits are usually controlled with dispersants and scale inhibitors in cooling and process water. Among the dispersants mentioned are polymers and copolymers, for example, poly(acrylic acid) and its salts, acrylamideacrylic acid copolymers and poly(maleic acid).

Further, it is known to use clays such as talc and bentonite in paper making for fillers, pitch control, and retention and drainage control. In filler applications, talc or bentonite may be added in an amount which is typically relatively high.

In pitch control applications, talc or bentonite may be added before the washer and after the digester. At this position, the temperature of the aqueous system is relatively low. The use of talc and bentonite for pitch control is discussed in BOARDMAN, "The Use of Organophilic Mineral Particulates in the Control of Anionic Trash Like Pitch", *TAPPI Proceedings* (1996), the disclosure of which is herein incorporated by reference in its entirety. In particular, this article discloses using two pounds per ton of montmorillonite.

In retention and drainage control, it is believed that bentonite and a high molecular weight cationic polymer (e.g., molecular weight of about $1 \times 10^6$ to $10 \times 10^6$) may be added just before the headbox. For instance, it is believed that 3–10 lb of bentonite/ton of oven dried fibers may be added near the headbox which would result in about 15–50 ppm of bentonite in the aqueous system for a 1 wt % aqueous paper furnish. It is believed that the aqueous system just before the headbox typically has a pH of about 5 to 8.5 and a temperature of about 40° C. to 60° C.

SUMMARY OF THE INVENTION

It is an object of the present invention to prevent scale formation and/or deposition, such as alkaline earth metal scale deposition, especially calcium carbonate scale deposition.

It is another object of the present invention to provide inorganic compounds, such as polyvalent metal silicates and polyvalent metal carbonates, that can effectively prevent scale formation and/or deposition.

It is still another object of the present invention to provide a family of compounds that can effectively prevent scale formation and/or deposition on surfaces, such as metallic and plastic surfaces, in contact with a scale-forming aqueous system.

In accordance with one aspect, the present invention is directed to a method for inhibiting scale deposits in an aqueous system, comprising: adding anti-scalant to the aqueous system such that an amount of anti-scalant in the aqueous system is up to about 500 ppm, wherein the anti-scalant comprises at least one of polyvalent metal silicate and polyvalent metal carbonate, and wherein the aqueous system has a pH of at least about 9.

In accordance with another aspect, the present invention is directed to a method for inhibiting scale deposits in an aqueous system, comprising: adding anti-scalant to the aqueous system such that an amount of anti-scalant in the aqueous system is up to about 500 ppm, wherein the anti-scalant comprises at least one of polyvalent metal silicate and polyvalent metal carbonate, and wherein the aqueous system comprises up to about 0.4 ppm of cationic polymer.

In accordance with still another aspect, the present invention is directed to a method for inhibiting scale deposits in an aqueous system of a paper mill, comprising: adding anti-scalant to the aqueous system at at least one of before a pulping digester and at a pulping digester, wherein the anti-scalant comprises at least one of polyvalent metal silicate and polyvalent metal carbonate.

In accordance with yet another aspect, the present invention is directed to a method for inhibiting scale deposits in an aqueous system, comprising: adding anti-scalant to the aqueous system such that an amount of anti-scalant in the aqueous system is up to about 500 ppm, wherein the anti-scalant comprises at least one of magnesium aluminum silicate, hydrated magnesium aluminum silicate, calcium bentonite, saponite, sepiolite, calcium carbonate, magnesium carbonate, ferrous carbonate, manganese carbonate, dolomite, hectorite, amorphous magnesium silicate, and zinc carbonate.

In accordance with another aspect, the present invention is directed to a method for inhibiting scale deposits in an aqueous system, comprising: adding a nucleation promoter/initiator to the aqueous system to inhibit formation of scale deposits, such that an amount of the nucleation promoter/initiator in the aqueous system is up to about 500 ppm.

In accordance with a further aspect, the present invention is directed to a method for inhibiting scale deposits in an aqueous system, comprising: adding first cations to the aqueous system and removing second cations which are distinct from the first cations from the aqueous system, to inhibit the second cations from forming scale deposits; and wherein the aqueous system is at a temperature of about 70° C. to 500° C.

In accordance with another aspect, the present invention is directed to a composition, comprising: ground calcium carbonate; and sodium montmorillonite.

In accordance with yet another aspect, the present invention is directed to a composition, comprising: magnesium aluminum silicate; and sodium montmorillonite.

In accordance with another aspect, the present invention is directed to an aqueous pulp slurry, comprising: wood pulp; metal cations; anions; and about 50 to 500 ppm of an anti-scalant comprised of at least one of magnesium aluminum silicate, hydrated magnesium aluminum silicate, saponite, sepiolite, calcium carbonate, magnesium carbonate, ferrous carbonate, manganese carbonate, dolomite, hectorite, amorphous magnesium silicate, and zinc carbonate.

In one aspect, the anti-scalant comprises an aluminosilicate backbone.

In a further aspect, the anti-scalant comprises at least one functional group which comprises at least one of carboxylic, sulfonate, sulfate, and phosphate.

In another aspect, the anti-scalant comprises at least one of sodium montmorillonite, magnesium aluminum silicate, talc, hydrated magnesium aluminum silicate, calcium bentonite, saponite, sepiolite, calcium carbonate, magnesium carbonate, ferrous carbonate, manganese carbonate, and dolomite.

In yet another aspect, the anti-scalant comprises at least one of sodium aluminosilicate, magnesium aluminosilicate, hectorite, amorphous magnesium silicate, calcium carbonate, magnesium carbonate, zinc carbonate, ferrous carbonate, and manganese carbonate.

In still another aspect, the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

In another aspect, the anti-scalant comprises polyvalent metal carbonate and comprises at least one of calcium carbonate, magnesium carbonate, ferrous carbonate, manganese carbonate, dolomite, and zinc carbonate.

In yet another aspect, the anti-scalant comprises ground calcium carbonate and sodium montmorillonite.

In still another aspect, the anti-scalant comprises magnesium aluminum silicate and sodium montmorillonite.

In another aspect, the anti-scalant has a mean particle size less than about 10 microns.

In yet another aspect, the anti-scalant has a specific surface area of about 10 to 1000 m²/g.

In still another aspect, the aqueous system has a pH of about 9 to 14.

In another aspect, the scale comprises alkaline earth metal scale. The alkaline earth metal scale may comprise calcium carbonate.

In still another aspect, the aqueous system comprises at least one of calcium, barium, magnesium, aluminium, bicarbonate, carbonate, sulfate, and phosphate.

In yet another aspect, the aqueous system has a $[Ca^{+2}]$ of about 10 to 500 ppm and a $[CO_3^{-2}]$ of about 100 to 30,000 ppm prior to addition of the anti-scalant.

In still another aspect, the aqueous system has a temperature of about 25° C. to 500° C.

In a further aspect, the aqueous system is at a pressure of about 80 to 1500 psi.

In another aspect, the anti-scalant is added to a cooling tower, a heat exchanger, an evaporator, before a pulping digester, to a pulping digester, or to a washer.

In still another aspect, the method further comprises processing a crude oil-water mixture.

In yet another aspect, the scale comprises calcium carbonate, the anti-scalant has a mean particle size of less than about 10 microns, the anti-scalant has a specific surface area of about 10 to 1000 m²/g, the aqueous system has a pH of about 9 to 14, the aqueous system has a $[Ca^{+2}]$ of about 10 to 500 ppm and a $[CO_3^{-2}]$ of about 100 to 30,000 ppm prior to addition of the anti-scalant, and the aqueous system has a temperature of about 25° C. to 500° C.

In still another aspect, the anti-scalant is added after a chip bin.

In another aspect, the cationic polymer which is present in the aqueous system has a molecular weight of greater than about $1 \times 10^6$.

In a further aspect, a weight ratio of ground calcium carbonate to sodium montmorillonite is about 0.1:1 to 20:1. Accordingly, the anti-scalant may comprise about 10 wt % to 95 wt % of the ground calcium carbonate. The anti-scalant may also comprise about 5 wt % to 90 wt % of the sodium montmorillonite.

In yet another aspect, a weight ratio of magnesium aluminum silicate to sodium montmorillonite is about 0.1:1 to 20:1. Thus, the anti-scalant may comprise about 10 wt % to 95 wt % of the magnesium aluminum silicate. The anti-scalant may comprise about 5 wt % to 90 wt % of the sodium montmorillonite.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

Before further discussion, a definition of the following terms will aid in the understanding of the present invention.

"Nucleation initiator/promoter": substance which initiates and promotes nucleation and precipitation of polyvalent metal silicate or polyvalent metal carbonate in the solution phase.

"Water hardness": amount of magnesium and calcium ions in an aqueous solution.

As an overview, the present invention relates to methods and inorganic compositions for inhibiting the formation, deposition, and adherence of scale deposits on substrate surfaces in contact with a scale-forming aqueous system. The scale deposits may be alkaline earth metal scale deposits, such as alkaline earth metal carbonate scale deposits, especially calcium carbonate scale deposits.

The preferred anti-scalants of the present invention include polyvalent metal silicates and polyvalent metal carbonates. The polyvalent metal silicate or polyvalent metal carbonate may be crystalline or amorphous. The polyvalent metal silicates and polyvalent metal carbonates may have functional groups such as carboxylic, sulfonate, sulfate, and phosphate. For example, the functional groups may be obtained by treating a polyvalent metal silicate or polyvalent metal carbonate with an organic or inorganic compound having a functional group such as carboxylic, sulfonate, sulfate, and phosphate. Examples of these compounds include polymers such as polyacrylate and polyacrylic acid, and surfactants such as alkylbenzene sulfonate, alkylbenzene sulfate, and alkylbenzene phosphate ester.

Polyvalent metal silicates include clays. Clays are naturally occurring hydrous aluminosilicates with a 2- or 3-layer crystal structure which has ion substitution for aluminium, examples of such ion substitutes include magnesium, iron, and sodium. Alkali and alkaline earth elements may also be constituents of clays. Hydrogen is usually present as hydroxyl in the structure and as water both within the structure and absorbed on the surface. These substitutions create a wide diversity in chemical composition within the broad general class of phyllosilicates or layer silicates. It is well known that relatively small differences in the chemical composition of clays can greatly influence their chemical and physical properties.

All phyllosilicates contain silicate or aluminosilicate layers in which sheets of tetrahedrally coordinated cations, Z, such as ions of magnesium, aluminum, and iron, of composition $Z_2O_5$, are linked through shared oxygens to sheets of cations, which are octahedrally coordinated to oxygens and hydroxyls. When one octahedral sheet is linked to one tetrahedral sheet, a 1:1 layer is formed as in kaolinite; when one octahedral sheet is linked to two tetrahedral sheets, one on each side, a 2:1 layer is produced as in talc and pyrophyllite. Structural units that may be found between aluminosilicate layers are sheets of cations octahedrally coordinated with hydroxyls, as in chlorites, and individual cations which may or may not be hydrated, as in smectites, bentonites, vermiculites, and micas. Some 2:1 layer silicates swell in water, ethylene glycol, and a wide range of similar compounds by intercalation of molecules between 2:1 layers.

Polyvalent metal carbonates include various combinations of polyvalent metals and carbonates. Preferred examples of the polyvalent metal include calcium, magnesium, iron, manganese, and zinc. For instance, alkaline earth metal carbonates include calcium carbonate mixed with magnesium carbonate. Depending on the milling process and dispersants (e.g., polyacrylate) added to the limestone, as discussed below, different particle sizes and specific surface areas of ground calcium carbonate particles can be generated.

The polyvalent metal silicates and polyvalent metal carbonates may be synthetic or naturally occurring. Examples of synthetic polyvalent metal silicates and polyvalent metal carbonates include precipitated calcium carbonate and silica-derived products such as magnesium silicate, aluminosilicate, magnesium aluminum silicate, etc. As discussed in more detail below, various particle sizes, surface areas, pore size diameters, and ion exchange capacities of synthetic polyvalent metal silicates and polyvalent metal carbonates can be made commercially.

Preferred examples of the anti-scalants of the present invention are listed in the following non-limiting list which is not intended to be an exhaustive list:
Natural Polyvalent Metal Silicates and Metal Carbonates
Polyvalent Metal Silicates
    sodium montmorillonite (bentonite)
    magnesium aluminum silicate
        smectite clay
        colloidal attapulgite clay
    talc (hydrous magnesium silicate)
    hydrated magnesium aluminum silicate (e.g., smectite clay)
    calcium bentonite
    saponite (magnesium bentonite)
    sepiolite
Polyvalent Metal Carbonates
    calcium carbonate
    magnesium carbonate
    ferrous carbonate
    manganese carbonate
    dolomite
Synthetic Polyvalent Metal Silicates and Metal Carbonates
Polyvalent Metal Silicates
    sodium aluminosilicate
        hydrated Na-A type zeolite
        mordenite zeolite
        synthetic amorphous precipitated silicate
    magnesium aluminum silicate
    synthetic hectorite (synthetic magnesium silicate)
    amorphous magnesium silicate
Polyvalent Metal Carbonates
    calcium carbonate
    magnesium carbonate
    zinc carbonate
    ferrous carbonate
    manganese carbonate In selecting other anti-scalants which may be useful in the present invention, compounds with an aluminosilicate backbone tend to function as anti-scalants.

Further, the selection of other anti-scalants may be based upon how the anti-scalants of the present invention are hypothesized to function. While not wishing to be bound by theory, the present invention may involve one or more of the following mechanisms, depending upon the type of anti-scalant.

For some anti-scalants, the mechanism of the present invention may involve ion exchange similar to the ion exchange involved in water softening. For instance, sodium ions could be exchanged for calcium ions, so as to reduce the concentration of calcium ions in the aqueous system to reduce precipitation of calcium compounds. It is believed that reducing the calcium concentration also slows the growth rate of calcium based crystals, such that the crystals which are formed tend to be smaller and more uniform. Smaller crystals are more stable in the aqueous phase and are less likely to precipitate on the equipment.

According to another hypothesized mechanism, the anti-scalant of the present invention may function as a nucleation initiator/promoter. Thus, the anti-scalant of the present invention may function as a seed. For instance, the scaling compound may precipitate on the anti-scalant instead of precipitating on the equipment. The nucleation initiator/promoter may be inorganic. Although other compounds may function as nucleation initiator/promoters, it is particularly believed that ground calcium carbonate functions as a nucleation promoter/initiator.

According to still another hypothesized mechanism, the anti-scalant of the present invention may function through surface adsorption. Although surface adsorption may be involved in the ion exchange and nucleation mechanisms described above, surface adsorption may be an independent mechanism. For instance, in surface adsorption it is not necessary for a separate solid phase to be formed on the surface of the anti-scalant.

In view of the above, it is hypothesized that the anti-scalant of the present invention may function as at least one of an ion exchanger, a nucleation promoter/initiator, and a surface adsorber, depending upon the anti-scalant.

The above listed anti-scalants may also be used in combination with each other. It was surprisingly found that some combinations of the above-listed anti-scalants resulted in synergism. In particular, combinations of sodium montmorillonite with either ground calcium carbonate or magnesium aluminum silicate yield unexpected results.

Regarding the combination of calcium carbonate and sodium montmorillonite, the weight ratio of calcium carbonate to sodium montmorillonite is preferably about 0.1:1 to 20:1, more preferably about 0.5:1 to 7:1, and most preferably about 1:1 to 4:1. Thus, the amount of calcium carbonate in the combination of calcium carbonate and sodium montmorillonite, with respect to a total amount of anti-scalant, is preferably about 10 wt % to 95 wt %, more preferably about 30 wt % to 90 wt %, and most preferably about 50 wt % to 80 wt %. Accordingly, the amount of sodium montmorillonite in the combination of calcium carbonate and sodium montmorillonite, with respect to a total amount of anti-scalant, is preferably about 5 wt % to 90 wt %, more preferably about 10 wt % to 70 wt %, and most preferably about 20 wt % to 50 wt %.

Concerning the combination of magnesium aluminum silicate and sodium montmorillonite, the weight ratio of magnesium aluminum silicate to sodium montmorillonite is preferably about 0.1:1 to 20:1, more preferably about 0.5:1 to 7:1, and most preferably about 1:1 to 4:1. Thus, the amount of magnesium aluminum silicate in the combination of magnesium aluminum silicate and sodium montmorillonite, with respect to a total amount of anti-scalant, is preferably about 10 wt % to 95 wt %, more preferably about 30 wt % to 90 wt %, and most preferably about 50 wt % to 80 wt %. Accordingly, the amount of sodium montmorillonite in the combination of magnesium aluminum silicate and sodium montmorillonite, with respect to a total amount of anti-scalant, is preferably about 5 wt % to 90 wt %, more preferably about 10 wt % to 70 wt %, and most preferably about 20 wt % to 50 wt %.

The particle size of the anti-scalant is preferably small. More specifically, depending upon the anti-scalant, the mean particle size of the anti-scalant is preferably less than about 100 microns, more preferably less than about 10 microns, with ranges of preferably about 0.01 to 10 microns, more preferably about 0.1 to 10 microns. Further, for alkaline earth metal carbonates the mean particle size is preferably about 0.1 to 2 microns.

One reason that the particle size of the anti-scalant should be small is to increase the specific surface area. Depending upon the anti-scalant, the specific surface area of the anti-scalant is preferably about 10 to 1500 m$^2$/g, more preferably about 50 to 1000 m$^2$/g. For example, zeolites available from Zeolyst International, Delfziji, the Netherlands can be synthesized with a specific surface area in the range of about 400 to 950 m$^2$/g.

Depending upon the type of anti-scalant, the ion exchange capacity of the anti-scalant may be an important variable. For anti-scalants which may involve ion exchange for preventing scaling, such as zeolites, the ion exchange capacity is preferably at least about 0.1 meq/g, more preferably at least about 0.5 meq/g, and most preferably about 1.0 meq/g, with ranges typically of about 0.1 to 10 meq/g, more typically about 0.5 to 8.0 meq/g, and most typically about 1.0 to 8.0 meq/g. In contrast, the ion exchange capacity of ground calcium carbonate is not important when the ground calcium carbonate is used to seed out calcium carbonate.

The amount of anti-scalant added to the aqueous system depends upon such variables as the temperature, the pH, and the presence of other compounds. Regarding temperature, higher temperatures usually require higher amounts of anti-scalant. The effect of changes in pH on the amount of anti-scalant required depends upon the type of anti-scalant. Similarly, the effect of the presence of other compounds on the amount of anti-scalant depends on the other compound.

For instance, compounds containing magnesium and iron may act as poisons such that more anti-scalant would be necessary. In contrast, compounds such as lignin function as enhancers such that less anti-scalant is necessary.

In view of the above, the anti-scalant is added to the aqueous system at a concentration of preferably about 1 ppb to 10 ppm, more preferably about 10 ppb to 5 ppm, and most preferably about 100 ppb to 5 ppm, per ppm of water hardness. Thus, the anti-scalant is added to the system at a concentration of up to about 50 ppm, more preferably up to about 75 ppm, even more preferably up to about 95 ppm, even more preferably up to about 200 ppm, even more preferably up to about 500 ppm, and most preferably up to about 1000 ppm, with ranges of preferably about 1 to 1000 ppm, more preferably about 2 to 500 ppm, and most preferably about 5 to 200 ppm. The anti-scalant may also be added to the system at a concentration of about 5 to 100 ppm.

The aqueous system to which the anti-scalant is added may contain metal ions, such as ions of calcium, barium, magnesium, aluminum, strontium, iron, etc. and anions such as bicarbonate, carbonate, sulfate, phosphate, silicate, fluoride, etc.

In aqueous systems having calcium ions and carbonate ions to which the anti-scalant may be added, prior to the addition of the anti-scalant the [Ca$^{+2}$] is usually present at about 10 to 500 ppm, more usually about 20 to 300 ppm, and most usually about 50 to 200 ppm. Moreover, prior to addition of the anti-scalant, the [CO$_3^{-2}$] in such systems is usually present at about 100 to 30,000 ppm, more usually about 500 to 25,000 ppm, and most usually about 1000 to 20,000 ppm.

The aqueous system may also include other additives and compounds. However, the anti-scalant of the present invention is often used in the presence of up to about 0.4 ppm of cationic polymer, more usually in the presence of up to about 0.1 ppm of cationic polymer, and most usually in the presence of up to about 0.01 ppm of cationic polymer. The cationic polymer which is present may have a molecular weight greater than about 1×10$^6$, with a usual range of about 1×10$^6$ to 10×10$^6$.

The aqueous system to which the anti-scalant is added may be at an elevated temperature. For instance, the temperature of the system may typically be about 25° C. to 500° C., more typically about 70° C. to 500° C., even more typically about 80° C. to 200° C. When the anti-scalant is added to a digester, the temperature of the aqueous system is usually about 150° C. to 175° C. When the anti-scalant is added at a chip chute pump prior to the digester, the temperature of the aqueous system is usually about 80° C. to 110° C.

The anti-scalants of the present invention work under acidic conditions against some forms of scale, but generally do not function well against carbonate scales under acidic conditions. Thus, the aqueous system to which the anti-scalant is added generally has a basic pH, more usually a pH of at least about 9, such as about 9 to 14, even more usually about 10 to 13. As noted above, changes in pH may cause scaling.

The aqueous system to which the anti-scalant is added may be under atmospheric conditions or under pressure. For instance, the pressure is typically about 14 to 1500 psi, more typically about 80 to 1500 psi. When the aqueous system comprises a digester of a paper mill, the pressure at the digester is typically about 125 to 150 psi. When the aqueous system comprises a boiler, the pressure at the boiler is typically up to about 1500 psi.

To ensure that the anti-scalant is adequately dispersed in the aqueous system, the anti-scalant is preferably added in the form of a water-based slurry. Depending upon the anti-scalant, the water-based slurry comprises preferably up to about 40 wt % of anti-scalant, more preferably up to about 50 wt % of anti-scalant, even more preferably up to about 60 wt % of anti-scalant, and most preferably up to about 75 wt % of anti-scalant.

Examples of the systems to which the anti-scalant may be added include industrial water systems, such as cooling towers, heat exchangers, evaporators, pulping digesters, washers, and in the production and processing of crude oil-water mixtures, etc.

In particular, scale deposition in a digester in kraft pulp manufacturing can be controlled in accordance with the present invention. It follows that the run length of the digester can be extended to achieve improvements in productivity, uniform quality of pulp, and a reduction in energy loss. Further, troubles arising from scale deposit are greatly diminished, which makes a valuable contribution to improvement of operating efficiency.

The addition point of the anti-scalant may be at or before where scale may be formed. For example, the anti-scalant may be added before a pulping digester or at the pulping digester. When the anti-scalant is added before the pulping digester, it is often added after or during mechanical treatment of the wood chips. For instance, the anti-scalant may be added after a chip bin, at a wood chip chute pump, at a cooking liquor heater pump, or at an in-line drainer. When the anti-scalant is added directly to the digester or other systems, the addition point may be targeted to where the anti-scaling is needed most. For instance, the anti-scalant may be added in the cooking zone of the digester.

The anti-scalants of the present invention perform better than known anti-scaling polymers under many conditions. In addition to adequate or improved performance, the raw material cost of the polyvalent metal silicates and polyvalent metal carbonates is significantly lower than that of the known anti-scalants. Therefore, an advantage of the present invention is cost-effectiveness.

Once the anti-scalant has been used, it may be preferred that the anti-scalant be removed from the system. The removal of the anti-scalant depends upon the system. For instance, removal may be by filtration or centrifugation. Another removal technique involves cationic fixation with a high molecular weight cationic polymer. The molecular weight of the cationic polymer is preferably about $1 \times 10^6$ to $10 \times 10^6$. Examples of preferred cationic polymers which may be used in cationic fixation include polyamine and polyDADMAC (diallyldimethylammonium chloride).

The present invention will be further illustrated by way of the following Examples. These examples are non-limiting and do not restrict the scope of the invention.

Unless stated otherwise, all percentages, parts, etc. presented in the examples are by weight.

EXAMPLES 1–39 AND COMPARATIVE EXAMPLES 1 AND 2

A bottle test was conducted to determine the effect of polyvalent metal silicates and polyvalent metal carbonates on calcium carbonate scale inhibition and to compare their performance to known scale inhibitors. As discussed in more detail below, the test conditions were 70° C., pH 12.4, and a one-hour incubation time with mild agitation.

An aqueous hardness solution of 2.205 wt % calcium chloride was prepared. An aqueous alkaline solution of 0.18 wt % sodium carbonate and 0.2125 wt % sodium hydroxide was prepared. Both solutions were simultaneously added to 100 ml glass bottles followed by anti-scalants, as listed in Table 1, in proportions to achieve 100 g of final solution having the compositions listed in Tables 2 and 3, below. The solution pH was adjusted to 12.4 by adding sodium hydroxide. As shown in Tables 2 and 3, the final solution involved either a "mild" scaling condition of 60 ppm $Ca^{-2}$ (150 ppm as $CaCO_3$) and 1000 ppm $CO_3^{-2}$, or a "harsh" scaling condition of 100 ppm $Ca^{+2}$ (250 ppm as $CaCO_3$) and 10,000 ppm $CO_3^{-2}$.

After being agitated for 1 hour at 70° C., the solution was removed from the test bottle and subjected to vacuum filtration using a #4 Whatman filter (pore size <20–25 $\mu$m). For these Examples and Comparative Examples, it is approximated that $CaCO_3$ crystals having a particle size less than about 20–25 microns have less tendency to precipitate on a substrate, and that crystals having a particle size greater than about 20–25 microns would be more likely to precipitate on a substrate and, therefore, would likely precipitate as scale. For instance, the relationship between particle size, crystallization rate, and precipitation is discussed in column 3 of U.S. Pat. No. 3,518,204 to HANSEN et al., the disclosure of which is herein incorporated by reference in its entirety. The filtrate sample was added to 2 grams of 30 wt % hydrochloric acid to prevent further crystal formation/growth.

After removal of the test solution from the test bottle, an "adherent" sample was generated for each test bottle, which involved rinsing the glass bottle with 50 grams of 14 wt % nitric acid. The adherent sample indicates the amount of calcium carbonate that deposits onto the bottle surface during the test period.

All liquid samples were analyzed by Inductively Coupled Plasma (ICP) for calcium ion concentrations. ICP was conducted by using an "IRIS-AP Duo" inductively coupled plasma spectrometer available from Thermo Jarrell Ash Corporation, Franklin, Mass. The operating conditions of the "IRIS-AP Duo" inductively coupled plasma spectrometer were as follows. The exhaust was turned on and the pressure gauge indicated a pressure drop of 0.8 to 1.2 psi. The CID (charge injection device) temperature was below –70° C. and the FPA (Focal Plane Array) temperature was above 5° C. The purge time was set to 90 seconds. The ignition parameters were: RF (Radio Frequency) Power: 1150 watts, Auxiliary Flow: medium, Nebulizer Flow: 0.55 L/min, and Pump Rate 110 rpm. The purge gas valves for tank and main were set to 4 L/min and 6 L/min, respectively. The camera valve setting was 2 L/min. After the spectrometer was set as discussed above, the spectrometer was allowed to warm up for at least 15 minutes before running the auto-sampler.

As noted above, Table 1 lists the anti-scalants which were used in these Examples and Comparative Examples.

TABLE 1

| Anti-Scalant | Chemical Name | Trade Name | Mfg. | Physical/Chemical Properties |
|---|---|---|---|---|
| A | sodium aluminosilicate (hydrated Na-A type zeolite) | Valfor 100 | The PQ Corp., Valley Forge, PA | Silica-to-alumina molar ratio = 2:1<br>median particle size 3 to 6 $\mu$m<br>normal pore size diameter = 4.2 Angstroms<br>pH of 1 wt % dispersion = 10 to 11<br>ion exchange capacity = 5.6 Meq/g hydrated zeolite<br>clacium exchange capacity = 270–300 mg $CaCO_3$/g anhydrous zeolite<br>$Na_2O$ (17 wt %), $Al_2O_3$ (28 wt %), $SiO_2$ (33 wt %), $H_2O$ (22 wt %) |
| B | sodium aluminosilicate (mordenite type zeolite) | Valfor CBV 20A | The PQ Corp., Valley Forge, PA | $SiO_2/Al_2O_3$ mole ratio = 20<br>Surface Area = 500 $m^2$/g |
| C | magnesium aluminum silicate (colloidal attapulgite clay) | Min-U-Gel 400 | Floridin, Tallahassee, FL | median particle size 3.22 $\mu$m (range 3.02 to 3.47 $\mu$m)<br>pH = 9.7 sp. gr. = 2.4<br>$Al_2O_3$ (10.37 wt %), $SiO_2$ (58.66 wt %), MgO (8.59 wt %), $Fe_2O_3$ (3.56 wt %), CaO (2.59 wt %), $H_2O$ (11.4 wt %) |
| D | ground calcium carbonate | Hydrocarb 60 | OMYA, Inc., Proctor, VT | mean particle diameter = 1.9 $\mu$m<br>specific surface area = 6 $m^2$/g<br>pH slurry = 8.5 sp. gr. = 2.71 |
| E | ground calcium carbonate | Hydrocarb 65 | OMYA, Inc., Proctor, VT | mean particle diameter = 0.7 $\mu$m<br>specific surace area = 14 $m^2$/g<br>pH slurry = 8.5 sp. gr. = 2.71 |
| F | ground calcium carbonate | Hydrocarb HG | OMYA, Inc., Proctor, VT | mean particle diameter = 0.3 $\mu$m<br>pH slurry = 8.5 sp. gr. = 2.71 |
| G | sodium montmorillonite (bentonite) | Bentolite HS | Southern Clay Products, Inc., Gonzales, TX | particle size range = 0.1 to 5 microns<br>pH = 10.3 moisture = moisture = 6 wt % |
| H | synthetic hectorite (synthetic magnesium silicate) | Laponite RD | Southern Clay Products, Inc., Gonzales, TX | surface area = 370 m2/g<br>pH of 2 wt % suspension = 9.8<br>$SiO_2$ (59.5 wt %), MgO (27.5 wt %), $Na_2O$ (2.8 wt %), $Li_2O$ (0.8 wt %), ignition loss (8.2 wt %) |
| I | talc (hydrous magnesium silicate) | Vantale F2003 | R. T. Vanderbilt Co., Norwalk, CT | mean particle diameter = 2.8 $\mu$m<br>specific surface area = 10 $m^2$/g<br>pH slurry = 9.5 sp. gr. = 2.75<br>$SiO_2$ (59.5 wt %), MgO (30.4 wt %), $Al_2O_3$ (0.4 wt %), $Fe_2O_3$ (3.2 wt %), CaO (0.3 wt %), ignition loss (6.3 wt %) |
| J | magnesium aluminum silicate (smectite clay) | Veegum | R. T. Vanderbilt Co., Norwalk, CT | $SiO_2$ (63 wt %), MgO (10.5 wt %), $Al_2O_3$ (10.5 wt %), $Fe_2O_3$ (0.9 wt %), CaO (2.3 wt %), $Na_2O$ (2.4 wt %), $K_2O$ (1.32 wt %), ignition loss (7.5 wt %)<br>sp. gr. = 2.6 pH slurry = 9.5 |
| K | hydrated magnesium aluminum silicate (smectite clay) | Veegum HV | R. T. Vanderbilt Co., Norwalk, CT | $SiO_2$ (62 wt %), MgO (11.9 wt %), $Al_2O_3$ (10.7 wt %), $Fe_2O_3$ (0.7 wt %), CaO (2.4 wt %), $Na_2O$ (2.6 wt %), $K_2O$ (1.7 wt %), ignition loss (9 wt %) |
| L | sodium aluminosilicate (synthetic amorphous precipitated silicate) | Zeolex 23A | Kraft Chemical Co., Melrose Park, IL | avg. particle size = 6 $\mu$m<br>pH of 20 wt % dispersion = 10.2<br>surface area = 75 $m^2$/g |
| M | amorphous magnesium silicate | DAC III | Delta Chem., Inc., Searsport, ME | sp. gr. = 2.5 |
| N | a blend of magnesium bentonite and calcium bentonite | GEL | IMV Nevada, Amardosa Valley, NV | 97% minimum <200 mesh<br>$SiO_2$ (47.2 wt %), $Al_2O_3$ (14.1 wt %), MgO (12.4 wt %), $Fe_2O_3$ (2 wt %), CaO (4.2 wt %) |
| O | sepiolite | Thermogel | IMV Nevada, Armdosa Valley, NV | finely-ground powder<br>$SiO_2$ (56 wt %), $Al_2O_3$ (4 wt %), MgO (20 wt %),<br>$Fe_2O_3$ (1 wt %), CaO (0.5 wt %) |
| P | hydrated magnesium aluminum silicate | Veegum F | R. T. Vanderbilt Co., Norwalk, CT | 2 to 4 wt % cristobalite |

TABLE 1-continued

| Anti-Scalant | Chemical Name | Trade Name | Mfg. | Physical/Chemical Properties |
|---|---|---|---|---|
| Q | hydrated magnesium aluminum silicate | VanGel B | R. T. Vanderbilt Co., Norwalk, CT | 4 to 6 wt % cristobalite |
| R | sepiolite | Sepiogel F | IMV Nevada, Armdosa Valley, NV | 90% minimum <325 mesh moisture = 14 wt % |
| S | calcium bentonite | IGB | IMV Nevada, Armdosa Valley, NV | 98% minimum <200 mesh moisture = 13 wt % $SiO_2$ (50.9 wt %), $Al_2O_3$ (20.8 wt %), $Fe_2O_3$ (1.5 wt %), MgO (2.4 wt %), CaO (4 wt %) |
| T | saponite (magnesium bentonite) | Imvite 1016 | IMV Nevada, Armdosa Valley, NV | finely-ground powder moisture = 10 wt % $SiO_2$ (44.6 wt %), $Al_2O_3$ (7.8 wt %), $Fe_2O_3$ (2.5 wt %), MgO (22.8 wt %), CaO (4.5 wt %) |
| U | magnesium aluminum silicate | Magnabrite T | American Colloid Co., Arlington Heights, IL | soft white flakes sp. gr. = 2.6 |

The conditions and results of these tests are shown in Tables 2 and 3 below. For Table 2 the test conditions were at a temperature of 70° C., pH of 12.5, $[Ca^{+2}]=60$ ppm, and $[CO_3^{-2}]=1000$ ppm. In Table 2, "% inhibition" is a relative measure of how much scale formation is prevented, such that higher values reflect better prevention of scale formation. Percent inhibition is calculated as follows:

$$\% \text{ inhibition} = \frac{\text{(Ca conc. of treated sample)} - \text{(Ca conc. of untreated sample)}}{\text{(Ca conc. total)} - \text{(Ca conc. of untreated sample)}}$$

Taking into consideration that the Ca concentration (as $CaCO_3$) of the untreated sample is the Ca concentration (asCaCO_3) of Comparative Example 1 which is 5.9 ppm, and taking into consideration that the Ca concentration (as $CaCO_3$) total is 150 ppm, the percent inhibition for Example 1 is 11% =(21-5.9)/(150-5.9). Also, in Table 2, "% deposition" is the weight percent of Ca (as $CaCO_3$) which deposited on the surface.

TABLE 2

Soluble Calcium Conc. ($CaCO_3$ crystal size < 20 microns)

| Example | Anti-scalant | Conc. (ppm) | Ca Conc. (as $CaCO_3$) (ppm) | % Inhibition | Ca Conc. (as $CaCO_3$) (ppm) | % deposition |
|---|---|---|---|---|---|---|
| Comp. 1 | None | — | 5.9 | — | 22 | 15% |
| 1 | A | 50 | 21 | 11% | 2.8 | 2% |
| 2 | A | 100 | 96 | 63% | 7.6 | 5% |
| 3 | B | 25 | 17 | 8% | 13 | 9% |
| 4 | B | 50 | 16 | 7% | 9 | 6% |
| 5 | B | 100 | 19 | 9% | 9.7 | 7% |
| 6 | C | 25 | 54 | 33% | 2.8 | 2% |
| 7 | C | 50 | 63 | 40% | 2.3 | 2% |
| 8 | C | 100 | 76 | 49% | 1.8 | 1% |
| 9 | G | 25 | 56 | 35% | 2.8 | 2% |
| 10 | G | 50 | 54 | 33% | 1.6 | 1% |
| 11 | G | 100 | 139 | 92% | 1.1 | 1% |
| 12 | H | 100 | 96 | 62% | 7 | 5% |
| 13 | I | 25 | 38 | 22% | 2.1 | 1% |
| 14 | I | 50 | 41 | 25% | 2.1 | 1% |
| 15 | I | 100 | 33 | 19% | 1.9 | 1% |
| 16 | L | 100 | 23 | 12% | 17 | 11% |
| 17 | M | 100 | 55 | 34% | 7.4 | 5% |
| 18 | N | 50 | 128 | 85% | 1.8 | 1% |
| 19 | N | 100 | 138 | 92% | 2.7 | 2% |
| 20 | O | 50 | 88 | 57% | 2.7 | 2% |
| 21 | O | 100 | 96 | 63% | 2.7 | 2% |
| 22 | P | 50 | 102 | 67% | 1.4 | 1% |
| 23 | P | 100 | 92 | 60% | 2.4 | 2% |
| 24 | Q | 50 | 73 | 47% | 2.5 | 2% |

TABLE 2-continued

| | | | Soluble Calcium Conc. (CaCO$_3$ crystal size < 20 microns) | | | |
|---|---|---|---|---|---|---|
| Example | Anti-scalant | Conc. (ppm) | Ca Conc. (as CaCO$_3$) (ppm) | % Inhibition | Ca Conc. (as CaCO$_3$) (ppm) | % deposition |
| 25 | Q | 100 | 93 | 60% | 5.1 | 3% |
| 26 | R | 50 | 108 | 71% | 1.5 | 1% |
| 27 | R | 100 | 110 | 72% | 1.8 | 1% |
| 28 | S | 50 | 97 | 63% | 2.2 | 2% |
| 29 | S | 100 | 117 | 77% | 2.9 | 2% |
| 30 | T | 50 | 127 | 84% | 1.9 | 1% |
| 31 | T | 100 | 127 | 84% | 2.1 | 1% |
| 32 | U | 50 | 118 | 78% | 1.5 | 1% |
| 33 | U | 100 | 122 | 81% | 1.2 | 1% |

Table 2 shows that under the "mild" scaling condition (i.e., 60 ppm $Ca^{+2}$ and 1000 ppm $CO_3^{-2}$), all tested anti-scalants, except anti-scalants B and L, were effective at either inhibiting crystal formation or reducing scale deposition on surface. The percent scale deposition was significantly reduced when calcium carbonate was treated with these polyvalent metal silicates and polyvalent metal carbonates, especially anti-scalants C, G, I, and N-U.

In Table 3 below, the test conditions were at a temperature of 70° C., pH 12.5, $[Ca^{+2}]$=100 ppm, and $[CO_3^{-2}]$=10,000 ppm.

TABLE 3

| | | | Soluble Calcium Conc. (CaCO$_3$ crystal size <20 microns) | | Scale Deposition on Surface | |
|---|---|---|---|---|---|---|
| Example | Anti-scalant | Conc. (ppm) | Ca Conc. (as CaCO$_3$) | % Inhibition | Ca Conc. (as CaCO$_3$) | % deposition |
| Comp. 2 | None | — | 15 | — | 27.0 | 11% |
| 34 | G | 50 | 54 | 17% | 4.5 | 2% |
| 35 | N | 50 | 161 | 62% | 3.7 | 2% |
| 36 | O | 50 | 87 | 31% | 4.5 | 2% |
| 37 | R | 50 | 95 | 34% | 4.2 | 2% |
| 38 | T | 50 | 181 | 71% | 3.1 | 1% |
| 39 | U | 50 | 154 | 59% | 2.9 | 1% |

Table 3 indicates that anti-scalants G, N, O, R, T, and U were also effective at reducing scale formation and deposition under the "harsh" condition (i.e., 100 ppm $Ca^{+2}$ and 10,000 ppm $CO_3^{-2}$).

In looking at the data of Tables 2 and 3, it should be noted that polyvalent metal silicates and polyvalent metal carbonates, such as magnesium aluminum silicate, magnesium silicate, magnesium bentonite, calcium bentonite, and sepiolite, are not normally used as water softeners, due to the lack of ion-exchanging properties. However, these polyvalent metal silicates and polyvalent metal carbonates perform effectively for CaCO$_3$ scale control. Surprisingly, sodium aluminosilicates (e.g., anti-scalant B and L), which supposedly function as water softeners, do not perform as well in terms of inhibiting CaCO$_3$ crystal formation and reducing scale deposition.

EXAMPLES 40–43 AND COMPARATIVE EXAMPLES 3–7

A "Parr®" bomb test was conducted to compare the performance of sodium montmorillonite (bentonite), i.e., anti-scalant G, with a known anti-scaling polymer. The experiments were conducted at a temperature which simulates the temperature of kraft pulping processes.

The test conditions were 170° C., pH 12.4, 60 ppm $Ca^{-2}$, 1000 ppm $CO_3^{-2}$, and a one-hour incubation time without agitation. The carbonate solution was preheated to 70° C. before mixing to obtain solutions having the concentrations listed in Tables 4 and 5, using the procedure described in Examples 1–39 and Comparative Examples 1 and 2.

After adding the solution to a Parr® bomb, Model 4751 available from Parr Instrument Company, Moline, Ill., having a capacity of 125 ml, the bombs were placed in an oven at 170° C. for one hour at a typical pressure of between 120 and 150 psi. After treatment, the bombs were removed from the oven and allowed to cool for one hour. The resulting fluids were removed from the bombs and subjected to a vacuum filtration as described in Examples 1–39 and Comparative Examples 1 and 2. After the fluid was removed from the bomb, an "adherent" sample was also generated from each Parr® bomb by dissolving the deposited calcium carbonate on the substrate surface with 50 grams of 14 wt % nitric acid. All fluid samples were analyzed by Inductively Coupled Plasma (ICP) for calcium ion concentrations using the procedure described in Examples 1–39 and Comparative Examples 1 and 2.

In Table 4 below, the test conditions were at a temperature of 170° C., pH 12.5, $[Ca^{+2}]$=60 ppm, and $[CO_3^{-2}]$=1000 ppm. Comparative Examples 4 and 5 involve "DRAW-FAX342" copolymer of maleic acid and acrylic acid (2:1 molar ratio) having a molecular weight of about 2700, available from Draw Chemical Company.

TABLE 4

| Example | Anti-scalant | Conc. (ppm) | Soluble Calcium Conc. (CaCO₃ crystal size <20 microns) | | Scale Deposition on Surface | |
|---|---|---|---|---|---|---|
| | | | Ca Conc. (as CaCO₃) | % Inhibition | Ca Conc. (as CaCO₃) | % deposition |
| Comp. 3 | None | — | 11 | — | 77 | 51% |
| 40 | G | 25 | 44 | 24% | 62 | 41% |
| 41 | G | 50 | 56 | 32% | 43 | 29% |
| 42 | G | 100 | 128 | 84% | 21 | 14% |
| Comp. 4 | DF342 | 20 | 34 | 16% | 58 | 39% |
| Comp. 5 | DF342 | 30 | 22 | 7% | 47 | 31% |

Table 4 shows that anti-scalant G, i.e., sodium montmorillonite, is more effective than the known polymer, i.e., "DRAWFAX342" copolymer of maleic acid and acrylic acid, with respect to the inhibition of crystal growth and reduction in scale deposition.

In Table 5 below, the test conditions were at a temperature of 170° C., pH 12.5, $[Ca^{+2}]$=100 ppm, and $[CO_3^{-2}]$=10,000 ppm.

TABLE 5

| Example | Anti-scalant | Conc. (ppm) | Soluble Calcium Conc. (CaCO₃ crystal size <20 microns) | | Scale Deposition on Surface | |
|---|---|---|---|---|---|---|
| | | | Ca Conc. (as CaCO₃) | % Inhibition | Ca Conc. (as CaCO₃) | % deposition |
| Comp. 6 | None | — | 7.4 | — | 88 | 35% |
| 43 | G | 100 | 125 | 48% | 8 | 3% |
| Comp. 7 | DF342 | 100 | 106 | 41% | 98 | 39% |

Table 5 shows that anti-scalant G, i.e., sodium montmorillonite, performed even better when subjected to the "harsh" condition.

EXAMPLES 44–66 AND COMPARATIVE EXAMPLES 8–18

These Examples and Comparative Examples involve using a dynamic tube blocking test to study the effectiveness of various scale inhibitors. A basic solution containing carbonate and anti-scalant was mixed with a calcium solution in a capillary to test the effectiveness of the anti-scalants in preventing scaling as measured by pressure build-up in the capillary.

In view of the above, except for Examples 54 and 55 which involved 73.78 g/l $Na_2CO_3$, the basic solution included:

37.09 g/l $Na_2CO_3$;

6 g/l NaOH (50 wt %); and anti-scalant in an amount to obtain the concentrations of Tables 6 and 7. The basic solution was fed through a first capillary at a flow rate of 12.5 ml/min. The calcium solution involved 0.74 g/l $CaCl_2.2H_2O$ and was fed at a rate of 12.5 ml/min through a second capillary which joined the first capillary to form a 2 meter-long capillary tube (internal diameter 0.127 cm).

As a result, the basic solution and calcium solution were mixed to form a supersaturated solution. The composition of the supersaturated aqueous solution was as follows, except for Examples 54 and 55 which involved 20,000 ppm of carbonate:

| | |
|---|---|
| Calcium ions | 96 ppm |
| Carbonate ions | 10,054 ppm |
| NaOH | 0.15 wt % (pH = 12.5) |
| Temperature | 170° C. |

The supersaturated solution was pumped through the 2 meter-long capillary at a flow rate of 25 ml/min at a temperature of 170° C. and pressure of 55 psi.

Calcium carbonate crystals formed and precipitated as soon as the two solutions were mixed in the capillary tube. The degree of precipitation was dependent on the effectiveness and concentration of the scale inhibitor, and was indicated by the back pressure across the capillary, which was measured by a pressure transducer. A low differential pressure was indicative of an effective treatment. The test was run for 30 minutes or until an increase of 1 psi was obtained. The longer the time (i.e., induced time) elapsed to reach 1 psi, the more effective the chemical treatment.

As listed in Tables 6 and 7, a number of polyvalent metal silicates and polyvalent metal carbonates were tested using the dynamic tube blocking test and the results were compared to the performance of known anti-scalants, such as PESA (polyepoxysuccinic acid), AMP (amino tri-(methylene phosphonic acid)), PBTC (2-phosphonobutane- 1,2,4-tricarboxylic acid), "DRAWFAX342" copolymer (described above), and "SB 37105" polyacrylic acid having a molecular weight of 3300, available from Performance Process Incorporated, Mundelein, Ill.

TABLE 6

| Example | Anti-scalant | Conc. (ppm) | $[CO_3^{-2}]$ | Induction Time to 1 psi (minutes) |
|---|---|---|---|---|
| Comp. 8 | None | — | 10,054 | 2 |
| Comp. 9 | PESA | 25 | 10,054 | 2 |
| Comp. 10 | PESA | 50 | 10,054 | 2 |
| Comp. 11 | DF342 | 50 | 10,054 | 11 |
| Comp. 12 | DF342 | 70 | 10,054 | 14 |
| Comp. 13 | DF342 | 150 | 10,054 | 20 |
| Comp. 14 | SB 37105 | 45 | 10,054 | 6 |
| Comp. 15 | SB 37105 | 150 | 10,054 | 26 |
| Comp. 16 | AMP | 60 | 10,054 | 24 |
| Comp. 17 | PBTC | 50 | 10,054 | 14 |
| 44 | E | 30 | 10,054 | 29 |
| 45 | F | 10 | 10,054 | 29 |
| 46 | F | 15 | 10,054 | >30 (0.7 psi @ 30 min) |
| 47 | F | 30 | 10,054 | 26 |
| 48 | G | 15 | 10,054 | 10 |
| 49 | G | 30 | 10,054 | 31 (0.9 psi @ 30 min) |
| 50 | G | 50 | 10,054 | >30 (0.8 psi @ 30 min) |
| 51 | G | 70 | 10,054 | >30 (0.3 psi @ 30 min) |
| 52 | G | 150 | 10,054 | >30 (0.3 psi @ 30 min) |
| 53 | K | 150 | 10,054 | 20 |
| 54 | K | 500 | 20,000 | 4 |
| 55 | G | 200 | 20,000 | >30 (0.5 psi @ 30 min) |

The results in Table 6 indicate that PESA and maleic acid copolymer were not effective at inhibiting crystal growth and reducing scale deposition on the tube surface, as reflected by the very short induction time (2–6 minutes) to reach a differential pressure of 1 psi. In comparison, the untreated calcium carbonate solution reached this differential pressure in approximately 2 minutes.

Table 6 also indicates that the performance of anti-scalants E, F, and G was superior to the known anti-scalants. For instance, the performance of anti-scalant G at 30 ppm was more efficient than that of AMP at 60 ppm. It was expected that sodium aluminosilicate zeolite (i.e., anti-scalant A) would not perform well under the conditions of 96 ppm calcium and 20,000 ppm carbonate concentration, while Example 55 shows that under these conditions anti-scalant G still effectively controlled CaCO$_3$ scale formation and deposition.

Table 7 involves scale inhibition of sodium montmorillonite blended with either another polyvalent metal silicate or a polyvalent metal carbonate.

TABLE 7

| Ex. | Anti-Scalant | Conc. (ppm) | Induction Time to 1 psi (minutes) |
|---|---|---|---|
| Comp. 18 | None | | 2 |
| 56 | G | 30 ppm | 31 (0.9 psi @ 30 min) |
| 57 | G | 50 ppm | >30 (0.8 psi @ 30 min) |
| 58 | G | 70 ppm | >30 (0.3 psi @ 30 min) |
| 59 | G/J (1:1) | 40 ppm | >30 (0.4 psi @ 30 min) |
| 60 | J | 70 ppm | 6 |
| 61 | J | 150 ppm | 20 |
| 62 | G/E (1:1) | 30 ppm | >30 (0.9 psi @ 30 min) |
| 63 | G/E (1:3) | 30 ppm | 26 (0.6 psi @ 30 min) |
| 64 | G/F (2:1) | 10 ppm | >30 (0.3 psi @ 30 min) |
| 65 | G/F (2:1) | 20 ppm | >30 (0.3 psi @ 30 min) |
| 66 | G/F (2:1) | 200 ppm | >30 (0.2 psi @ 30 min) |

Table 7 shows that a strong synergism was observed when anti-scalant F was blended with anti-scalant G at a weight ratio of 1:2. For instance, at 30 minutes the blend still exhibited a very low differential pressure (0.3 psi), at a very low dosage of 10 ppm. In comparison, a differential pressure of 1 psi was reached for anti-scalant G (15 ppm) at 10 minutes and 29 minutes for anti-scalant F (10 ppm) at the same pressure. Table 7 also shows that a blend of anti-scalant J and anti-scalant G appeared to show a synergy.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A method for inhibiting scale deposits in an aqueous system, comprising:
adding anti-scalant to the aqueous system such that an amount of anti-scalant in the aqueous system is up to about 1000 ppm, wherein the anti-scalant comprises at least one of polyvalent metal silicate and polyvalent metal carbonate, and wherein the aqueous system has a pH of at least about 9.

2. The method of claim 1, wherein the anti-scalant comprises an aluminosilicate backbone.

3. The method of claim 1, wherein the anti-scalant comprises at least one functional group which comprises at least one of carboxylic, sulfonate, sulfate, and phosphate.

4. The method of claim 1, wherein the anti-scalant comprises at least one of sodium montmorillonite, magnesium aluminum silicate, talc, hydrated magnesium aluminum silicate, calcium bentonite, saponite, sepiolite, calcium carbonate, magnesium carbonate, ferrous carbonate, manganese carbonate, zinc carbonate, and dolomite.

5. The method of claim 1, wherein the anti-scalant comprises at least one of sodium aluminosilicate, magnesium aluminosilicate, hectorite, amorphous magnesium silicate, calcium carbonate, magnesium carbonate, zinc carbonate, ferrous carbonate, and manganese carbonate.

6. The method of claim 1, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

7. The method of claim 1, wherein the anti-scalant comprises polyvalent metal carbonate and comprises at least one of calcium carbonate, magnesium carbonate, ferrous carbonate, manganese carbonate, dolomite, and zinc carbonate.

8. The method of claim 1, wherein the anti-scalant comprises ground calcium carbonate and sodium montmorillonite.

9. The method of claim 1, wherein the anti-scalant comprises magnesium aluminum silicate and sodium montmorillonite.

10. The method of claim 1, wherein the anti-scalant has a mean particle size less than about 10 microns.

11. The method of claim 1, wherein the anti-scalant has a specific surface area of about 10 to 1000 m$^2$/g.

12. The method of claim 1, wherein the aqueous system has a pH of about 9 to 14.

13. The method of claim 1, wherein the scale comprises alkaline earth metal scale.

14. The method of claim 1, wherein the scale comprises calcium carbonate.

15. The method of claim 1, wherein the aqueous system comprises at least one of calcium, barium, magnesium, aluminium, bicarbonate, carbonate, sulfate, and phosphate.

16. The method of claim 1, wherein the aqueous system has a [$Ca^{+2}$] of about 10 to 500 ppm and a [$CO_3^{-2}$] of about 100 to 30,000 ppm prior to addition of the anti-scalant.

17. The method of claim 1, wherein the aqueous system has a temperature of about 25° C. to 500° C.

18. The method of claim 1, wherein the aqueous system is at a pressure of about 80 to 1500 psi.

19. The method of claim 1, wherein the anti-scalant is added to a cooling tower.

20. The method of claim 1, wherein the anti-scalant is added to a heat exchanger.

21. The method of claim 1, wherein the anti-scalant is added to an evaporator.

22. The method of claim 1, wherein the anti-scalant is added before a pulping digester.

23. The method of claim 1, wherein the anti-scalant is added to a pulping digester.

24. The method of claim 1, wherein the anti-scalant is added to a washer.

25. The method of claim 1, further comprising processing a crude oil-water mixture.

26. The method of claim 1, wherein the scale comprises calcium carbonate, and wherein the anti-scalant has a mean article size of less than about 10 microns, and wherein the anti-scalant has a specific surface area of about 10 to 1000 m$^2$/g, and wherein the aqueous system has a pH of about 9 to 14, and wherein the aqueous system has a [$Ca^{+2}$] of about 10 to 500 ppm and a [$CO_3^{-2}$] of about 100 to 30,000 ppm prior to addition of the anti-scalant, and wherein the aqueous system has a temperature of about 25° C. to 500° C.

27. A method for inhibiting scale deposits in an aqueous system, comprising:
adding anti-scalant to the aqueous system such that an amount of anti-scalant in the aqueous system is up to about 1000 ppm, wherein the anti-scalant comprises at least one of polyvalent metal silicate and polyvalent metal carbonate, and wherein the aqueous system comprises up to about 0.4 ppm of cationic polymer.

28. The method of claim 27, wherein the cationic polymer has a molecular weight of greater than about 1×10$^6$.

29. The method of claim 27, wherein the anti-scalant comprises an aluminosilicate backbone.

30. The method of claim 27, wherein the anti-scalant comprises at least one functional group which comprises at least one of carboxylic, sulfonate, sulfate, and phosphate.

31. The method of claim 27, wherein the anti-scalant comprises at least one of sodium montmorillonite, magnesium aluminum silicate, talc, hydrated magnesium aluminum silicate, calcium bentonite, saponite, sepiolite, calcium carbonate, magnesium carbonate, ferrous carbonate, manganese carbonate, and dolomite.

32. The method of claim 27, wherein the anti-scalant comprises at least one of sodium aluminosilicate, magnesium aluminosilicate, hectorite, amorphous magnesium silicate, calcium carbonate, magnesium carbonate, zinc carbonate, ferrous carbonate, and manganese carbonate.

33. The method of claim 27, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

34. The method of claim 27, wherein the anti-scalant comprises polyvalent metal carbonate and comprises at least one of calcium carbonate, magnesium carbonate, ferrous carbonate, manganese carbonate, dolomite, and zinc carbonate.

35. A method for inhibiting scale deposits in an aqueous system of a paper mill, comprising:
adding anti-scalant to the aqueous system at at least one of before a pulping digester and at a pulping digester, wherein the anti-scalant comprises at least one of polyvalent metal silicate and polyvalent metal carbonate.

36. The method of claim 35, wherein the amount of anti-scalant in the aqueous system is up to about 1000 ppm.

37. The method of claim 35, wherein the anti-scalant comprises an aluminosilicate backbone.

38. The method of claim 35, wherein the anti-scalant comprises at least one functional group which comprises at least one of carboxylic, sulfonate, sulfate, and phosphate.

39. The method of claim 35, wherein the anti-scalant comprises at least one of sodium montmorillonite, magnesium silicate, talc, hydrated magnesium aluminum silicate, calcium bentonite, saponite, sepiolite, calcium carbonate, magnesium carbonate, ferrous carbonate, manganese carbonate, and dolomite.

40. The method of claim 35, wherein the anti-scalant comprises at least one of sodium aluminosilicate, magnesium aluminosilicate, hectorite, amorphous magnesium silicate, calcium carbonate, magnesium carbonate, zinc carbonate, ferrous carbonate, and manganese carbonate.

41. The method of claim 35, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

42. The method of claim 35, wherein the anti-scalant comprises polyvalent metal carbonate and comprises at least one of calcium carbonate, magnesium carbonate, ferrous carbonate, manganese carbonate, dolomite, and zinc carbonate.

43. The method of claim 35, wherein the anti-scalant is added after a chip bin.

44. A method for inhibiting scale deposits in an aqueous system, comprising:
adding anti-scalant to the aqueous system such that an amount of anti-scalant in the aqueous system is up to about 1000 ppm, wherein the anti-scalant comprises at least one of magnesium aluminum silicate, hydrated magnesium aluminum silicate, calcium bentonite, saponite, sepiolite, calcium carbonate, magnesium carbonate, ferrous carbonate, manganese carbonate, dolomite, hectorite, amorphous magnesium silicate, and zinc carbonate.

45. The method of claim 44, wherein the anti-scalant comprises at least one functional group which comprises at least one of carboxylic, sulfonate, sulfate, and phosphate.

46. The method of claim 44, wherein the anti-scalant comprises polyvalent metal silicate and comprises at least one of magnesium aluminum silicate, hydrated magnesium aluminum silicate, calcium bentonite, saponite, sepiolite, hectorite, and amorphous magnesium silicate.

47. The method of claim 44, wherein the anti-scalant comprises polyvalent metal carbonate and comprises at least one of calcium carbonate, magnesium carbonate, ferrous carbonate, manganese carbonate, dolomite, and zinc carbonate.

48. A method for inhibiting scale deposits in an industrial aqueous system, comprising:
adding a nucleation promoter/initiator having a mean particle size of 0.01 to 10 microns to the aqueous system to inhibit formation of scale deposists, such that an amount of the nucleation promoter/initiator in the aqueous system is up to about 1000 ppm, and wherein the aqueous system has a pH of at least about 9.

49. The method of claim 48, wherein the nucleation promoter/initiator comprises at least one of polyvalent metal silicate and polyvalent metal carbonate.

50. The method of claim 48, wherein the nucleation promoter/initiator comprises an aluminosilicate backbone.

51. The method of claim 48, wherein the anti-scalant comprises at least one functional group which comprises at least one of carboxylic, sulfonate, sulfate, and phosphate.

52. The method of claim 48, wherein the scale comprises calcium carbonate, and wherein the nucleation promoter/initiator has a mean particle size of less than about 10 microns, and wherein the nucleation promoter/initiator has a specific surface area of about 10 to 1000 m$^2$/g, and wherein the aqueous system has a pH of about 9 to 14, and wherein the aqueous system has a [Ca$^{+2}$] of about 10 to 500 ppm and a [CO$_3^{-2}$] of about 100 to 30,000 ppm prior to addition of the nucleation promoter/initiator, and wherein the aqueous system has a temperature of about 25° C. to 500° C.

53. A method for inhibiting scale deposits in an aqueous system, comprising:
adding first cations to the aqueous system and removing second cations which are distinct from the first cations from the aqueous system, to inhibit the second cations from forming scale deposits; and
wherein the aqueous system is at a temperature of about 70° C. to 500° C.

54. The method of claim 53, wherein adding the first cations comprises providing, in the aqueous system, at least one of polyvalent metal silicate and polyvalent metal carbonate.

55. The method of claim 53, wherein adding the first cations comprises providing, in the aqueous system, a compound having an aluminosilicate backbone.

56. The method of claim 54, wherein the at least one of polyvalent metal silicate and polyvalent metal carbonate comprises at least one functional group which comprises at least one of carboxylic, sulfonate, sulfate, and phosphate.

57. The method of claim 53, wherein the scale comprises calcium carbonate, and wherein adding the first cations comprises providing, in the aqueous system, a compound having a mean particle size less than about 10 microns, and wherein the compound has a specific surface area of about 10 to 1000 m$^2$/g, and wherein the aqueous system has a pH of about 9 to 14, and wherein the aqueous system has a [Ca$^{+2}$] of about 10 to 500 ppm and a [CO$_3^{-2}$] of about 100 to 30,000 ppm prior to addition of the first cations.

58. The method of claim 27, wherein the aqueous system has an acidic pH.

59. The method of claim 27, wherein the aqueous system has a pH of at least about 9.

60. The method of claim 27, wherein the aqueous system has a pH of about 9 to 14.

61. The method of claim 35, wherein the aqueous system has an acidic pH.

62. The method of claim 35, wherein the aqueous system has a pH of at least about 9.

63. The method of claim 35, wherein the aqueous system has a pH of about 9 to 14.

64. The method of claim 44, wherein the aqueous system has an acidic pH.

65. The method of claim 44, wherein the aqueous system has a pH of at least about 9.

66. The method of claim 44, wherein the aqueous system has a pH of about 9 to 14.

67. The method of claim 53, wherein the aqueous system has an acidic pH.

68. The method of claim 53, wherein the aqueous system has a pH of at least about 9.

69. The method of claim 53, wherein the aqueous system has a pH of about 9 to 14.

70. A method for inhibiting scale deposits in an aqueous system, comprising:
adding anti-scalant to the aqueous system such that an amount of anti-scalant in the aqueous system is up to about 1000 ppm, wherein the anti-scalant comprises polyvalent metal carbonate.

71. The method of claim 70, wherein the anti-scalant comprises at least one functional group which comprises at least one of carboxylic, sulfonate, sulfate, and phosphate.

72. The method of claim 70, wherein the anti-scalant comprises at least one of calcium carbonate, magnesium carbonate, zinc carbonate, ferrous carbonate, manganese carbonate, and dolomite.

73. The method of claim 70, wherein the anti-sealant comprises ground calcium carbonate and sodium montmorillonite.

74. The method of claim 70, wherein the anti-sealant has a mean particle size less than about 10 microns.

75. The method of claim 70, wherein the anti-sealant has a specific surface area of about 10 to 1000 m$^2$/g.

76. The method of claim 70, wherein the aqueous system has an acidic pH.

77. The method of claim 70, wherein the aqueous system has a pH of at least about 9.

78. The method of claim 70, wherein the aqueous system has a pH of about 9 to 14.

79. The method of claim 70, wherein the scale comprises alkaline earth metal scale.

80. The method of claim 70, wherein the scale comprises calcium carbonate.

81. The method of claim 70, wherein the aqueous system comprises at least one of calcium, barium, magnesium, aluminium, bicarbonate, carbonate, sulfate, and phosphate.

82. The method of claim 70, wherein the aqueous system has a $[Ca^{+2}]$ of about 10 to 500 ppm and a $[CO_3^{-2}]$ of about 100 to 30,000 ppm prior to addition of the anti-sealant.

83. The method of claim 70, wherein the scale comprises calcium carbonate, and wherein the anti-scalant has a mean particle size of less than about 10 microns, and wherein the anti-scalant has a specific surface area of about 10 to 1000 $m^2/g$, and wherein the aqueous system has a pH of about 9 to 14, and wherein the aqueous system has a $[Ca^{+2}]$ of about 10 to 500 ppm and a $[CO_3^{-2}]$ of about 100 to 30,000 ppm prior to addition of the anti-scalant, and wherein the aqueous system has a temperature of about 25° C. to 500° C.

84. A method for inhibiting scale deposits in an aqueous system, comprising:
   adding anti-scalant to the aqueous system such that an amount of anti-scalant in the aqueous system is up to about 1000 ppm, wherein the anti-scalant has a mean particle size of about 0.01 to 10 microns, wherein the anti-scalant has a sufficient specific surface area to inhibit scale deposits, and wherein the aqueous system has a pH of at least about 9.

85. The method of claim 84, wherein the anti-scalant comprises an aluminosilicate backbone.

86. The method of claim 84, wherein the anti-scalant comprises at least one functional group which comprises at least one of carboxylic, sulfonate, sulfate, and phosphate.

87. The method of claim 84, wherein the anti-scalant comprises at least one of sodium montmorillonite, magnesium aluminum silicate, talc, hydrated magnesium aluminum silicate, calcium bentonite, saponite, sepiolite, calcium carbonate, magnesium carbonate, zinc carbonate, ferrous carbonate, manganese carbonate, and dolomite.

88. The method of claim 84, wherein the anti-scalant comprises at least one of sodium aluminosilicate, magnesium aluminosilicate, hectorite, amorphous magnesium silicate, calcium carbonate, magnesium carbonate, zinc carbonate, ferrous carbonate, and manganese carbonate.

89. The method of claim 84, wherein the anti-scalant comprises polyvalent metal silicate and comprises at least one of sodium montmorillonite, magnesium aluminum silicate, talc, hydrated magnesium aluminum silicate, calcium bentonite, saponite, sepiolite, sodium aluminosilicate, hectorite, and amorphous magnesium silicate.

90. The method of claim 84, wherein the anti-scalant comprises polyvalent metal carbonate and comprises at least one of calcium carbonate, magnesium carbonate, ferrous carbonate, manganese carbonate, dolomite, and zinc carbonate.

91. The method of claim 84, wherein the anti-scalant comprises ground calcium carbonate and sodium montmorillonite.

92. The method of claim 84, wherein the anti-scalant comprises magnesium aluminum silicate and sodium montmorillonite.

93. The method of claim 84, wherein the anti-scalant has a specific surface area of about b 10to 1000 $m^2/g$.

94. The method of claim 84, wherein the scale comprises alkaline earth metal scale.

95. The method of claim 84, wherein the scale comprises calcium carbonate.

96. The method of claim 84, wherein the aqueous system comprises at least one of calcium, barium, magnesium, aluminium, bicarbonate, carbonate, sulfate, and phosphate.

97. The method of claim 84, wherein the aqueous system has a $[Ca^{+2}]$ of about 10 to 500 ppm and a $[CO_3^{-2}]$ of about 100 to 30,000 ppm prior to addition of the anti-scalant.

98. The method of claim 84, wherein the scale comprises calcium carbonate, and wherein the anti-scalant has a specific surface area of about 10 to 1000 $m^2/g$, and wherein the aqueous system has a pH of about 9 to 14, and wherein the aqueous system has a $[Ca^{+2}]$ of about 10 to 500 ppm and a $[CO_3^{-2}]$ of about 100 to 30,000 ppm prior to addition of the anti-scalant, and wherein the aqueous system has a temperature of about 25° C. to 500° C.

99. The method of claim 1, wherein the anti-scalant comprises polyvalent metal carbonate, and wherein the polyvalent metal carbonate comprises ground calcium carbonate.

100. The method of claim 27, wherein the anti-scalant comprises polyvalent metal carbonate, and wherein the polyvalent metal carbonate comprises ground calcium carbonate.

101. The method of claim 35, wherein the anti-scalant comprises polyvalent metal carbonate, and wherein the polyvalent metal carbonate comprises ground calcium carbonate.

102. The method of claim 44, wherein the anti-scalant comprises calcium carbonate, and wherein the calcium carbonate comprises ground calcium carbonate.

103. The method of claim 48, wherein the nucleation promoter/initiator comprises ground calcium carbonate.

104. The method of claim 70, wherein the polyvalent metal carbonate comprises ground calcium carbonate.

105. The method of claim 84, wherein the anti-scalant comprises ground calcium carbonate.

* * * * *

UNITED STATES PATENT AND TRADEMARK OFFICE
CERTIFICATE OF CORRECTION

PATENT NO. : 6,355,214 B1
DATED : March 12, 2002
INVENTOR(S) : T. Ling et al.

It is certified that error appears in the above-identified patent and that said Letters Patent is hereby corrected as shown below:

<u>Title page,</u>
Item [75], Inventors, the order of the inventors should be listed as follows:
-- Tien-Feng Ling
 Duy T. Nguyen
 Xiang H. Wang
 Mitzi K. Fader
 Fushan Zhang --

<u>Column 30,</u>
Line 8, "b 10to"" should be -- 10 to --.

Signed and Sealed this

Third Day of September, 2002

Attest:

JAMES E. ROGAN
Attesting Officer   Director of the United States Patent and Trademark Office